US008600731B2

(12) United States Patent
Cunnington et al.

(10) Patent No.: US 8,600,731 B2
(45) Date of Patent: Dec. 3, 2013

(54) UNIVERSAL TRANSLATOR

(75) Inventors: Sharon Kay Cunnington, Sammamish, WA (US); Jin Li, Sammamish, WA (US); Michel Pahud, Redmond, WA (US); Rajesh K. Hegde, Redmond, WA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 12/365,203

(22) Filed: Feb. 4, 2009

(65) Prior Publication Data
US 2010/0198579 A1 Aug. 5, 2010

(51) Int. Cl.
*G06F 17/28* (2006.01)

(52) U.S. Cl.
USPC ............... 704/3; 704/2; 704/4; 704/5; 704/8; 704/9

(58) Field of Classification Search
None
See application file for complete search history.

(56) References Cited

U.S. PATENT DOCUMENTS

| 5,615,301 | A | 3/1997 | Rivers | |
|---|---|---|---|---|
| 7,272,377 | B2 | 9/2007 | Cox et al. | |
| 7,353,166 | B2 | 4/2008 | Li et al. | |
| 7,983,910 | B2* | 7/2011 | Subramanian et al. | 704/250 |
| 2003/0069997 | A1* | 4/2003 | Bravin et al. | 709/250 |
| 2004/0044517 | A1 | 3/2004 | Palmquist | |
| 2004/0261033 | A1 | 12/2004 | Mabon | |
| 2005/0237382 | A1* | 10/2005 | White | 348/14.16 |
| 2005/0267826 | A1 | 12/2005 | Levy et al. | |
| 2006/0122903 | A1* | 6/2006 | Medrano et al. | 705/26 |
| 2006/0178918 | A1* | 8/2006 | Mikurak | 705/7 |
| 2006/0282269 | A1 | 12/2006 | Galison | |
| 2007/0244688 | A1 | 10/2007 | Bangalore et al. | |
| 2008/0012936 | A1 | 1/2008 | White | |
| 2008/0288241 | A1* | 11/2008 | Noda | 704/4 |
| 2009/0079816 | A1* | 3/2009 | Qvarfordt et al. | 348/14.16 |

FOREIGN PATENT DOCUMENTS

WO    WO2005015880 A1    2/2005

OTHER PUBLICATIONS

The first Multilingual Voice Recognition Dictionary Universal Translator http://www.universal-translator.net/. Last accessed Nov. 24, 2008, 2 pages.

* cited by examiner

*Primary Examiner* — Leonard Saint Cyr
(74) *Attorney, Agent, or Firm* — Lee & Hayes, PLLC

(57) ABSTRACT

The claimed subject matter provides a system and/or a method that facilitates communication within a telepresence session. A telepresence session can be initiated within a communication framework that includes two or more virtually represented users that communicate therein. The telepresence session can include at least one virtually represented user that communicates in a first language, the communication is at least one of a portion of audio, a portion of video, a portion of graphic, a gesture, or a portion of text. An interpreter component can evaluate the communication to translate an identified first language into a second language within the telepresence session, the translation is automatically provided to at least one virtually represented user within the telepresence.

20 Claims, 10 Drawing Sheets

UNIVERSAL TRANSLATOR

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

In light of such advances in computer technology (e.g., devices, systems, memory, wireless connectivity, bandwidth of networks, etc.), mobility for individuals have greatly. For example, with the advent of wireless technology, emails and other data can be communicated and received with a wireless communications device such as a cellular phone, smartphone, portable digital assistant (PDA), and the like. As a result, physical presence for particular situations has drastically reduced or been reduced. In an example, a business meeting between two or more individuals can be conducted virtually in which the two or more participants interact with one another remotely. Such virtual meetings that can be conducted with remote participants can be referred to as a telepresence session.

With the intense growth of the Internet, people all over the globe are utilizing computers and the Internet to conduct telepresence sessions. Although the capabilities of the Internet allow telepresence activities to be implemented around the world, the various languages spoken are constant boundaries that restrict the global reach of computers with Internet connections. Although conventional techniques enable portions of text to be translated, each computer and/or device must be specifically equipped to handle such translations with an appropriate plug-in or application for a specific language. Even with such traditional techniques, a particular device and/or computer may not be equipped with the specific language (e.g., the appropriate plug-in for the foreign language encountered) in light of the immense amount of languages existing in the world. Based on such linguistic boundaries, the Internet and telepresence sessions cannot reach full potential of enabling a boundary-free virtual environment.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate enabling telepresence sessions to communicate across cultures and languages, whereby a target conversation or expression can be translated to a language you understand, complete with cultures cues or transforms. For example, Americans tend to be more aggressive, while Easterners are more laid back. With this in mind, the telepresence session can provide insight to each party in order to increase the level of comfort, or prevent misinterpretations. Applications can be implemented for real video. In another instance, an avatar can be employed to represent a participant, and the avatar can behave differently based on the cultural targets or participants within the telepresence session.

Given that speech is often a vehicle controlling the telepresence session, a user can control the session with some sort of speech recognition as a trigger. Building from there, automatic translations can be provided within the session. An interpreter component can receive speech from the meeting, which can be translated into a chosen language. However, those fluent in another language can still participate in a collaborative session regardless of any language barrier since the conversations can automatically be translated into a language corresponding to each participant.

In addition to language translation, automatic cultural translation can also be provided. The interpreter component can be a guide with cultural cues on the side that can inform or suggest (e.g., discretely provide information and insight) that there is a cultural aspect that is in play based on the participants within the telepresence session. Additionally or alternatively, these cues can be automatically implemented into the avatar or video representation. In other aspects of the claimed subject matter, methods are provided that facilitate enabling translation between two disparate languages within a telepresence session.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
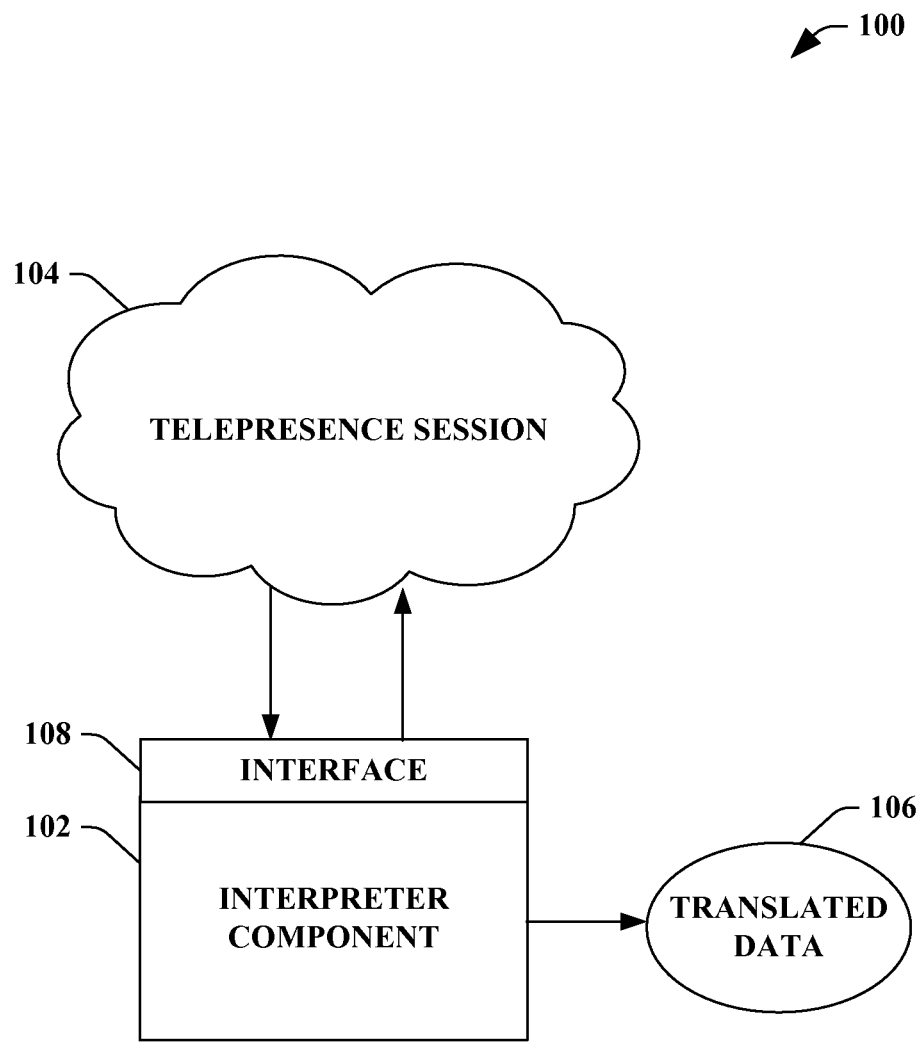
FIG. 1 illustrates a block diagram of an exemplary system that facilitates enabling translation between two disparate languages within a telepresence session.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "session," "engine," "adjuster," "collector," "device," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates enabling translation between two disparate languages within a telepresence session. The system 100 can include an interpreter component 102 that can provide translated data 106 for communications within a telepresence session 104. In particular, the interpreter component 102 can receive data communications via an interface component 108 between two or more virtually represented users communicating within the telepresence session 104. The interpreter component 102 can identify a source language (e.g., language to be translated) and a target language (e.g., language to translate into) based at least in part upon a request related to at least one virtually represented user within the telepresence 104. Furthermore, the interpreter component 102 can automatically translate communications within the telepresence session 104 and directly present such results to at least one virtually represented user within the telepresence session 104. It is to be appreciated that the language can be any suitable human language such as, but not limited to, English, Mandarin, Hindustani, Spanish, Arabic, Portuguese, Bengali, Russian, Japanese, German, Punjabi, Wu, Javanese, Telugu, Marathi, Vietnamese, Korean Tamil, French, Italian, Cantonese, Turkish, Sindhi, etc.

The telepresence session 104 (discussed in more detail in FIG. 5) can be a virtual environment in which two or more virtually represented users can communicate utilizing a communication framework. In general, a physical user can be represented within the telepresence session 104 in order to communicate to another user, entity (e.g., user, machine, computer, business, group of users, network, server, enterprise, device, etc.), and the like. For instance, the telepresence session 104 can enable two or more virtually represented users to communicate audio, video, graphics, images, data, files, documents, text, etc.

Thus, the interpreter component 102 can expand on the capabilities of the telepresence session 104 by employing automatic language translation. It is to be appreciated that the interpreter component 102 can provide language translations for and/or from any suitable communication form. For example, an audio communication can be detected and translated from a written communication to an audio communication (e.g., language translations for written communication form to an audio communication form). In another example, the language translation can be provided for a video segment in which the translated data can be presented as subtitles or closed captioning. In general, the interpreter component 102 can enable a source language regardless of communication form (e.g., a gesture, a hand motion, a head motion, arm motion, eye movement, a movement, a facial expression, audio, video, text, graphic, data, etc.) to be translated to a target language in any suitable communication form (e.g., audio, video, text, graphic, data, a gesture, a hand motion, a head motion, arm motion, eye movement, a movement, a facial expression, etc.).

For example, a first user and a second user can be virtually represented within a telepresence session, wherein the first user is an English speaking person and the second person is a Spanish speaking person. The first user can identify English as his or her language of choice in which the subject innovation can provide automatic translations to the first user in his or her selected language of choice. Thus, any communications from the second user (directed in Spanish or any other language other than English) can be translated to English for the comprehension of the first user. Similarly, the second user can identify Spanish as a desired language, in which the system 100 can automatically provide Spanish language translations for any communications (in languages other than Spanish) received within the telepresence session. It is to be appreciated that the users can identify more than one language of preference or choice if the user is multi-lingual (e.g., comprehends or understands more than one language).

In addition, the system 100 can include any suitable and/or necessary interface component 108 (herein referred to as "the interface 108"), which provides various adapters, connectors, channels, communication paths, etc. to integrate the interpreter component 102 into virtually any operating and/or database system(s) and/or with one another. In addition, the interface 108 can provide various adapters, connectors, channels, communication paths, etc., that provide for interaction with the interpreter component 102, telepresence session 104, translated data 106, and any other device and/or component associated with the system 100.

Figure 2:
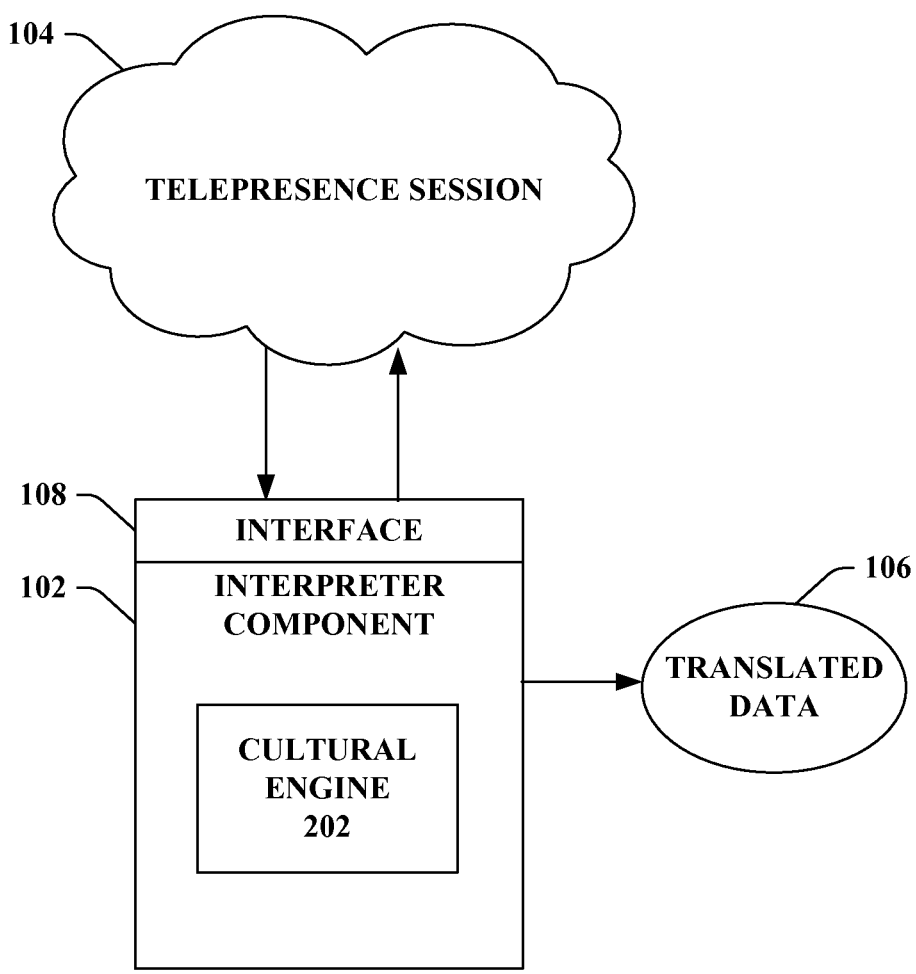
FIG. 2 illustrates a block diagram of an exemplary system that facilitates suggesting a response or action based upon an identified cultural cue detected within a telepresence session.

FIG. 2 illustrates a system 200 that facilitates suggesting a response or action based upon an identified cultural cue detected within a telepresence session. The system 200 can include the interpreter component 102 that can automatically translate communications associated with the telepresence session 104 from a first language (e.g., a source language) to a second language (e.g., a target language). The interpreter component 102 can analyze communications in various forms or mediums (e.g., audio, graphic, video, text, data, a gesture, a hand motion, a head motion, arm motion, eye movement, a movement, a facial expression, etc.) within the telepresence session 104 in order to automatically provide translated data 106. For example, a word processing document from a first user virtually represented within the telepresence session can be communicated to a second user virtually represented within the telepresence session. Yet, the document can be in a language that the second user may not understand or comprehend. The interpreter component 102 can translate the document from the source language to a language the second user understands. Moreover, the interpreter component 102 can evaluate the context of the telepresence session 104 in order to facilitate providing translations. In other words, the context of topics or presentations within the telepresence session 104 can assist in delivering accurate translations between languages.

The interpreter component 102 can further include a cultural engine 202 that can identify a cultural cue related to at least one of a cultural trait, a cultural custom, a cultural tradition, or a cultural behavior. The cultural engine 202 can observe and evaluate data and/or communications within the telepresence session 104 in order to identify a cultural cue, wherein the data and/or communications can include any suitable data such as, but not limited to, meeting details (e.g., start time, end time, date, etc.), participant information (e.g., physical location, profile information, age, connectivity, employee information, employment position, etc.), audio communications, observed gestures, observed movements, video communications, graphics, text, etc. Moreover, the cultural engine 202 can suggest at least one of a response or an action for the cultural cue based at least in part upon the evaluation and/or observation. The cultural engine 202 can enhance the telepresence session 104 by adapting behavior within the telepresence session 104 to various cultures. Furthermore, the cultural engine 202 can leverage a context associated with the telepresence session 104 in order to assist in identifying cultural cues in order to provide accurate responses, actions, etc. In another example, the cultural engine 202 can leverage telepresence data such as a type or format of the telepresence session in order to identify a cultural cue.

For example, users tend to feel more comfortable within a setting to which familiar actions or responses are received. Such actions or responses can be based upon a user's culture influenced by heritage, geographic location, or other factors. Thus, at the beginning of a meeting, a first culture may shake hands while another may bow. In general, the cultural engine 202 can identify such instances within the telepresence session 104 to which a response or action can be implemented. Such identified instances can be referred to as a cultural cue, wherein a suggested response, gesture, or action appropriate for such instance can be provided.

Cultural cues can trigger a suggested response, action, and/or gesture. The cultural cues can relate to various situations or instances that can occur during the telepresence session 104. For example, the cultural cues can relate to appearance (e.g., virtual representation appearance, clothing, physical appearance, accessories, etc.), introductions (e.g., start of a meeting, bowing, shaking hands, greetings, etc.), offensive behavior to avoid (e.g., words, phrases, hand gestures, etc.), pleasantries to encourage (e.g., words, phrases, responses, etc.), demonstrations of respect (e.g., eye-contact, sitting down, speaking, etc.), virtual exchange (e.g., exchanging business cards, exchanging documents, exchanging gifts, etc.), farewells (e.g., end of a meeting, bowing, shaking hands, verbal good-byes, etc.), and/or any other events or situations that arise between two or more users within the telepresence session 104 in which a particular action or response is preferred in a culture. For example, a culture may see a particular phrase or gesture as offensive and the cultural engine 202 can suggest avoiding such phrases or gestures. In another example, a response and action suggestion for receipt of a business card may include examination coupled with an action (e.g., bowing, etc.). Additionally, the cultural engine 202 can suggest adjustments to the virtual representation of the user in order to enhance the telepresence session 104. Thus, a cultural that looks negatively at jeans may see an avatar wearing slacks rather than jeans.

The cultural engine 202 can further utilize an interest indicator that can ascertain a level of interest for each user virtually represented within the telepresence session 104. The cultural engine 202 can evaluate various indicators related to the virtually represented user's attention or interest, wherein the indicators can be eye contact, participation amount, data interaction (e.g., accessing data related to the session, accessing the Internet, etc.), movement or actions (e.g., doodling, note-passing, thumb-twiddling, yawning, etc.), and/or any other indicator that indicates whether a user has interest in the telepresence session 104. For example, suppose user A is talking in a telepresence session. User B who is remote may get bored because of the way A is talking (e.g., perhaps due to cultural differences or the way the content is presented). The cultural engine 202 can indicate to A that B is not very interested at the moment. The cultural engine 202 can provide the detection of a "lack of interest" which can be culture dependent and can be obtained through body language, eye gaze detection, yawning etc.

It is to be appreciated that the cultural engine 202 can be utilized in connection with a user that relates to one or more cultures. In other words, the cultural engine 202 can adapt to users that have been influenced by two or more cultures with respective behaviors, traditions, and the like. In addition, the system 200 can ascertain instances when to initiate or activate at least one of a language translation or an indication of a cultural cue with related response or action. For example, evaluation of communications can indicate that one language is being spoken or utilized and when a second language is utilized, the system 200 can provide automatic translations and identification of a cultural cue.

The system 200 can further generate data for delivery prior to the start of the telepresence session 104 in order to provide a user with information on participants, languages, cultures, and the like. For example, the data can be a document, an email, a text message, a voicemail, etc. The data can enable a user to identify potential language barriers as well as the details associated with the represented cultures within the upcoming telepresence session 104.

Figure 3:
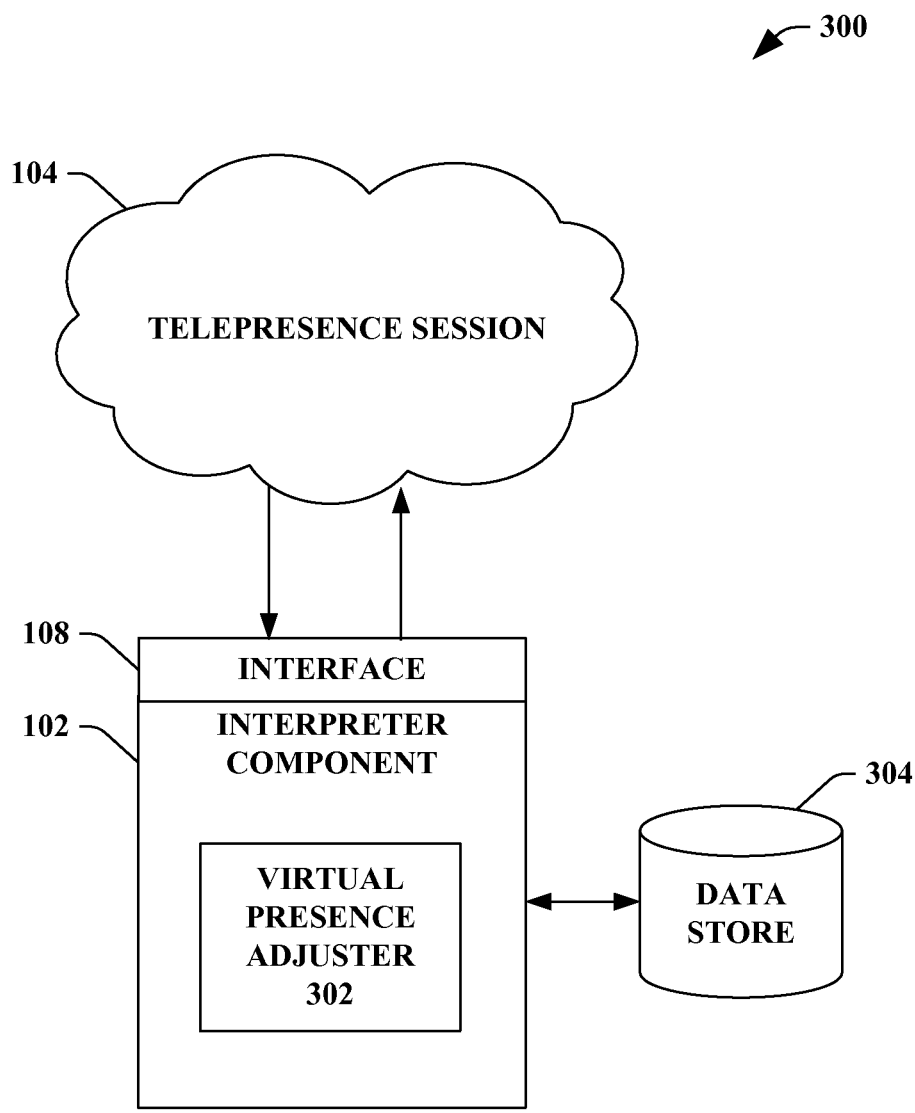
FIG. 3 illustrates a block diagram of an exemplary system that facilitates automatically updates a virtual presence based upon at least one of a translation or a cultural cue.

FIG. 3 illustrates a system 300 that facilitates automatically updates a virtual presence based upon at least one of a translation or a cultural cue. The system 300 can comprise the interpreter component 102 that can provide language translations within the telepresence session 104 to enhance the versatility of communications. For example, any data (e.g., text, audio, spoken language, audio from video, graphics, written text on data, gestures, movements, etc.) from a first language can be translated to data within another language. Moreover, the interpreter component 102 can leverage a cultural engine (not shown but discussed in FIG. 2) that can evaluate data and/or communications within the telepresence 104 in order to identify a cultural cue to which a suggested response or action can be provided.

The interpreter component 102 can further include a virtual presence adjuster 302 that can manipulate a virtual representation of a user within the telepresence in accordance with at least one of a translation or a cultural cue. It is to be appreciated that a physical user can be represented by a virtual presence or virtual representation within the telepresence session 104. For example, the virtual presence can be, but is not limited to being, an avatar, a graphic, a picture, a live-video stream, a stream from a web-camera, a portion of text (e.g., display of a written name, location, etc.), a portion of video, an animated object, and/or any other suitable displayable item that can be a placeholder for a presence within the telepresence session 104.

The virtual presence adjuster 302 can update (e.g., avatar mouth can move, clothing/appearance can be changed, etc.) the virtual presence or representation in accordance with a translation or a cultural cue. For example, the virtual presence can be updated and perceived to speak in a disparate language for the audience. Thus, a user may speak English, yet a participant may speak Chinese—in which the virtual presence/representation can be adjusted to speak in Chinese. In another example, the virtual presence adjuster 302 can manipulate the virtual presence or representation in accordance with a detected cultural cue and corresponding response or action. For example, based on identification of a cultural cue, a response or action can be implemented and displayed with the virtual presence. Following such example, an avatar can be restricted from folding arms during the telepresence session if it is identified that such actions/response can be offensive for a particular culture.

The system 300 can further include a data store 304 that can include any suitable data related to the interpreter component 102, the telepresence session 104, the cultural engine (not shown), the virtual presence adjuster 302, etc. For example, the data store 304 can include, but not limited to including, language definitions, language translations, voice recognition techniques/data, virtual representation/presence data (e.g., avatars, appearances, etc.), user settings, configurations for telepresence session, cultural cues, responses to cultural cues, actions to cultural cues, cultural cue definitions, real time identified cultural cues, virtual presence/representation adjustments, translation presentation techniques (e.g., display, closed captioning, subtitles, audio, audio voice, text size, font, etc.), cultural cue response/action settings (e.g., automatic response/action, user approval for action/response, etc.), any other suitable data related to the system 300, etc.

It is to be appreciated that the data store 304 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 304 of the subject systems and methods is intended to comprise, without being limited to, these and any other suitable types of memory. In addition, it is to be appreciated that the data store 304 can be a server, a database, a hard drive, a pen drive, an external hard drive, a portable hard drive, and the like.

Figure 4:
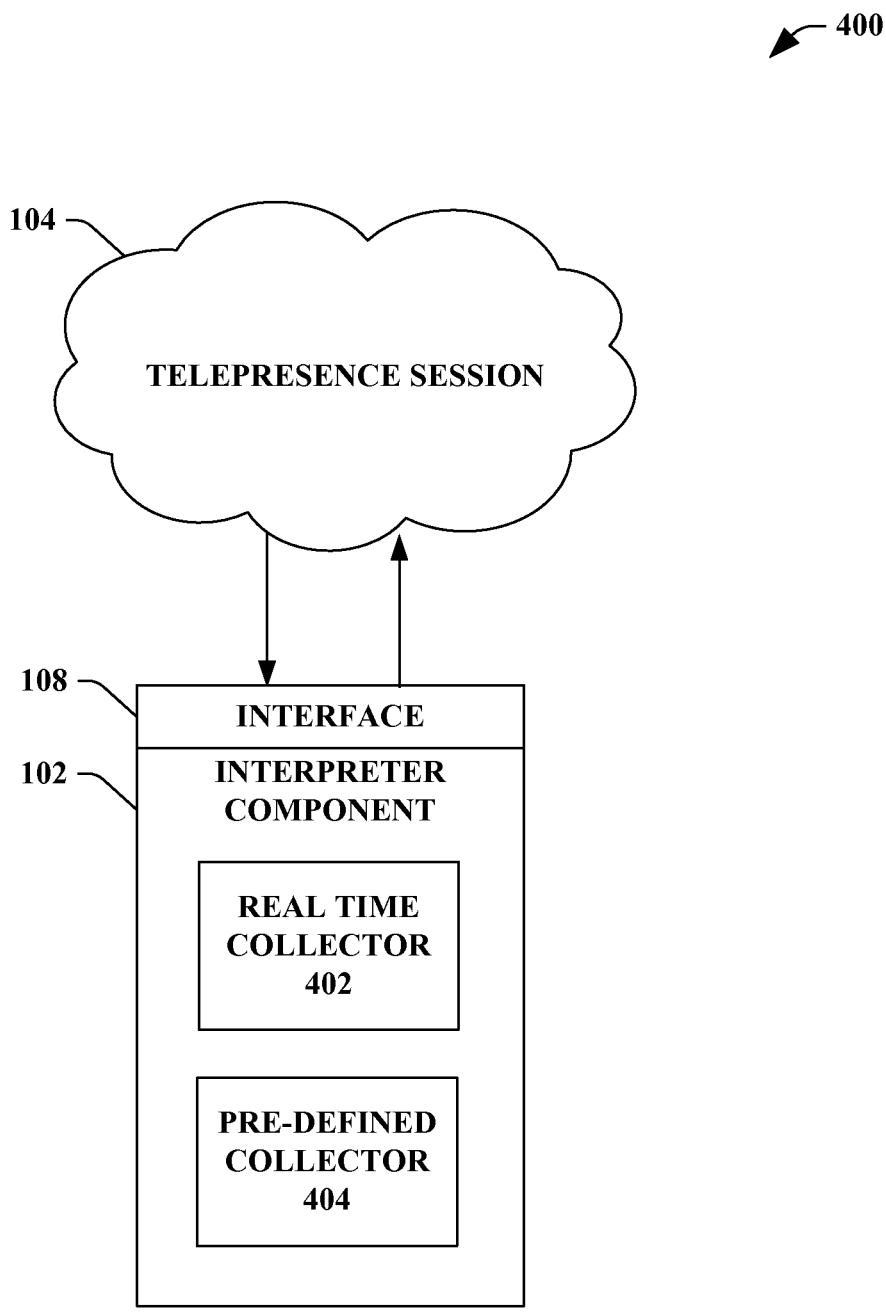
FIG. 4 illustrates a block diagram of an exemplary system that facilitates identifying cultural cues based upon pre-defined triggers or real time data collection.

FIG. 4 illustrates a system 400 that facilitates identifying cultural cues based upon pre-defined triggers or real time data collection. The system 400 can include the interpreter component 102 that can automatically provide language translations between two or more languages being utilized within the telepresence session 104. In addition, the interpreter component 102 can provide cultural cues that can trigger a suggested response or action. Such action or response can allow a user from a first culture to seamlessly mesh with a second user from a second culture within the telepresence session 104.

The interpreter component 102 can further include a real time collector 402 and a pre-defined collector 404. In general, the real time collector 402 and the pre-defined collector 404 can facilitate identifying cultural cues. Moreover, the real time collector 402 and the pre-defined collector 404 can enable the definition and adaptation to various cultures in order to allow the system 400 to suggest responses or actions to identified cultural cues. The real time collector 402 can gather information or data in real time from the telepresence session in order to ascertain cultural cues, responses to a cultural cue, and/or actions to a cultural cue. In particular, the real time collector 402 can monitor interactions or communications between users virtually represented within the telepresence session 104 (while noting each represented culture) and tracking reactions to such. For example, if a comment is made within the telepresence session 104 that a user from a culture finds offensive, such reaction can be identified, wherein such comment can be tagged as offensive for such culture. It is to be appreciated that the real time collector 402 and collected or gathered data (e.g., real time cues, etc.) can be accessed to edit such identified cultural cues. For example, the gathered cues can be stored in a data store (not shown but discussed in FIG. 3) in which a user can tag or identify accurate cultural cues. In another example, the cultural cues can be ranked or scored in order to provide a granular assessment of the gathered data.

Furthermore, the pre-defined collector 404 can include pre-established cultural cues, responses to cultural cues, and/or actions to cultural cues. Such pre-established data can be provided by cultural experts, cultural databases, user-defined preferences, and/or any other suitable entity that can provide cultural information relevant to cultural cues (e.g., business, disparate pre-defined cultural data from a user, group, survey data, Internet-based survey, enterprise, census data, etc.). For example, a user from a particular culture can provide his or her cultural cues, responses, and/or actions. It is to be appreciated that such pre-defined cultural cues, responses, and/or actions can be collected to be utilized as a network or aggregated database of cultural cues, responses, and/or actions.

Figure 5:
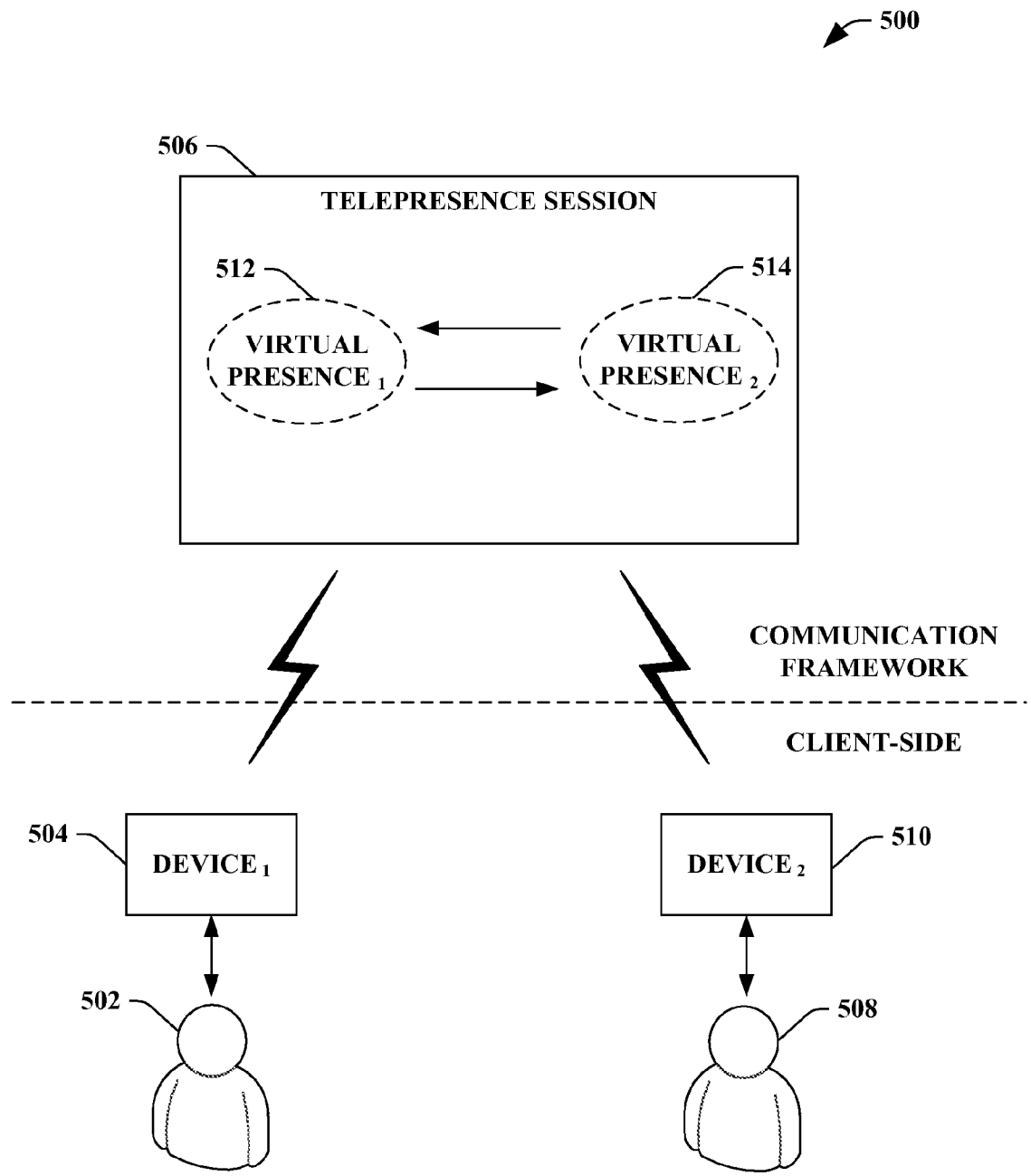
FIG. 5 illustrates a block diagram of exemplary system that facilitates enabling two or more virtually represented users to communicate within a telepresence session on a communication framework.

FIG. 5 illustrates a system 500 that facilitates enabling two or more virtually represented users to communicate within a telepresence session on a communication framework. The system 500 can include at least one physical user 502 that can leverage a device 504 on a client side in order to initiate a telepresence session 506 on a communication framework. Additionally, the user 502 can utilize the Internet, a network, a server, and the like in order to connect to the telepresence session 506 hosted by the communication framework. In general, the physical user 502 can utilize the device 504 in order to provide input for communications within the telepresence session 506 as well as receive output from communications related to the telepresence session 506. The device 504 can be any suitable device or component that can transmit or receive at least a portion of audio, a portion of video, a portion of text, a portion of a graphic, a portion of a physical motion, and the like. The device can be, but is not limited to being, a camera, a video capturing device, a microphone, a display, a motion detector, a cellular device, a mobile device, a laptop, a machine, a computer, etc. For example, the device 504 can be a web camera in which a live feed of the physical user 502 can be communicated for the telepresence session 506. It is to be appreciated that the system 500 can include a plurality of devices 504, wherein the devices can be grouped based upon functionality (e.g., input devices, output devices, audio devices, video devices, display/graphic devices, etc.).

The system 500 can enable a physical user 502 to be virtually represented within the telepresence session 506 for remote communications between two or more users or entities. The system 500 further illustrates a second physical user 508 that employs a device 510 to communicate within the telepresence session 506. As discussed, it is to be appreciated that the telepresence session 506 can enable any suitable number of physical users to communicate within the session. The telepresence session 506 can be a virtual environment on the communication framework in which the virtually represented users can communicate. For example, the telepresence session 506 can allow data to be communicated such as, voice, audio, video, camera feeds, data sharing, data files, etc.

Overall, the telepresence session 506 can simulate a real world or physical meeting place substantially similar to a business environment. Yet, the telepresence session 506 does not require participants to be physically present at a location. In order to simulate the physical real world business meeting, a physical user (e.g., the physical user 502, the physical user 508) can be virtually represented by a virtual presence (e.g., the physical user 502 can be virtually represented by a virtual presence 512, the physical user 508 can be represented by a virtual presence 514). It is to be appreciated that the virtual presence can be, but is not limited to being, an avatar, a video feed, an audio feed, a portion of a graphic, a portion of text, etc.

For instance, a first user can be represented by an avatar, wherein the avatar can imitate the actions and gestures of the physical user within the telepresence session. The telepresence session can include as second user that is represented by a video feed, wherein the real world actions and gestures of the user are communicated to the telepresence session. Thus, the first user can interact with the live video feed and the second user can interact with the avatar, wherein the interaction can be talking, typing, file transfers, sharing computer screens, hand-gestures, application/data sharing, etc.

Figure 6:
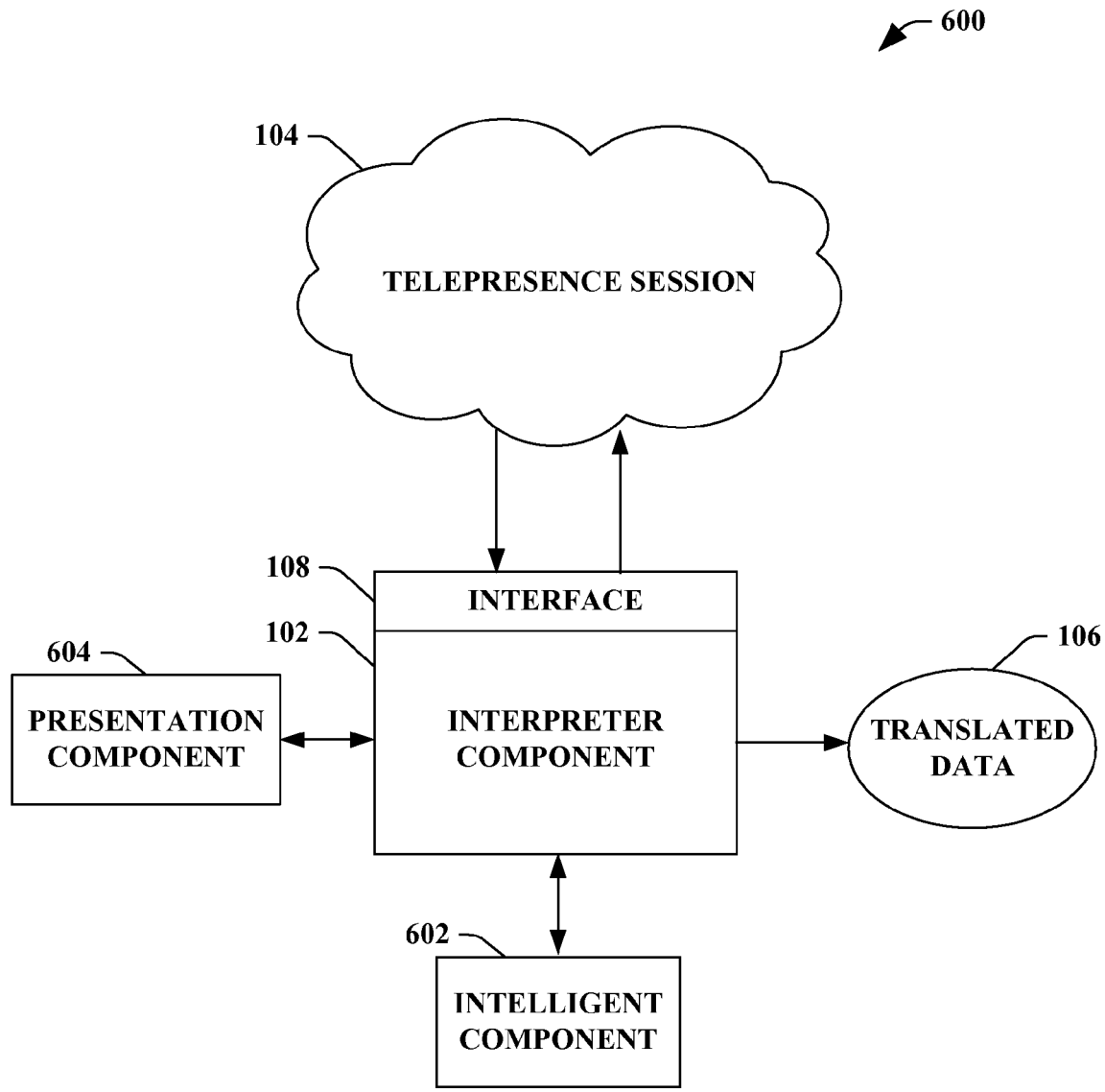
FIG. 6 illustrates a block diagram of an exemplary system that facilitates automatically translate communications or identify cultural cues for responses within a telepresence session.

FIG. 6 illustrates a system 600 that employs intelligence to facilitate automatically translating communications or identifying cultural cues for responses within a telepresence session. The system 600 can include the interpreter component 102, the telepresence session 104, translated data 106 which can be substantially similar to respective components, sessions, and data described in previous figures. The system 600 further includes an intelligent component 602. The intelligent component 602 can be utilized by the interpreter component 102 to facilitate translating language within communications associated with the telepresence session 104. Furthermore, the intelligent component 602 can be utilized by the interpreter component 102 to facilitate identify cultural cues and/or suggested responses/actions to a cultural cue. For example, the intelligent component 602 can infer language translations, cultural cues, responses to cultural cues, actions to cultural cues, user preferred translation presentation (e.g., audio, text, etc.), user preferred language, implementation of suggested responses/actions to identified cultural cues, culture definitions, real time analysis with identification of cultural cues, etc.

The intelligent component 602 can employ value of information (VOI) computation in order to identify translations, cultural cues, responses to cues, and/or actions to cues. For instance, by utilizing VOI computation, the most ideal and/or appropriate translation, cultural cue, responses to cues, and/or actions to cues can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The interpreter component 102 can further utilize a presentation component 604 that provides various types of user interfaces to facilitate interaction between a user and any component coupled to the interpreter component 102. As depicted, the presentation component 604 is a separate entity that can be utilized with the interpreter component 102. However, it is to be appreciated that the presentation component 604 and/or similar view components can be incorporated into the interpreter component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the interpreter component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
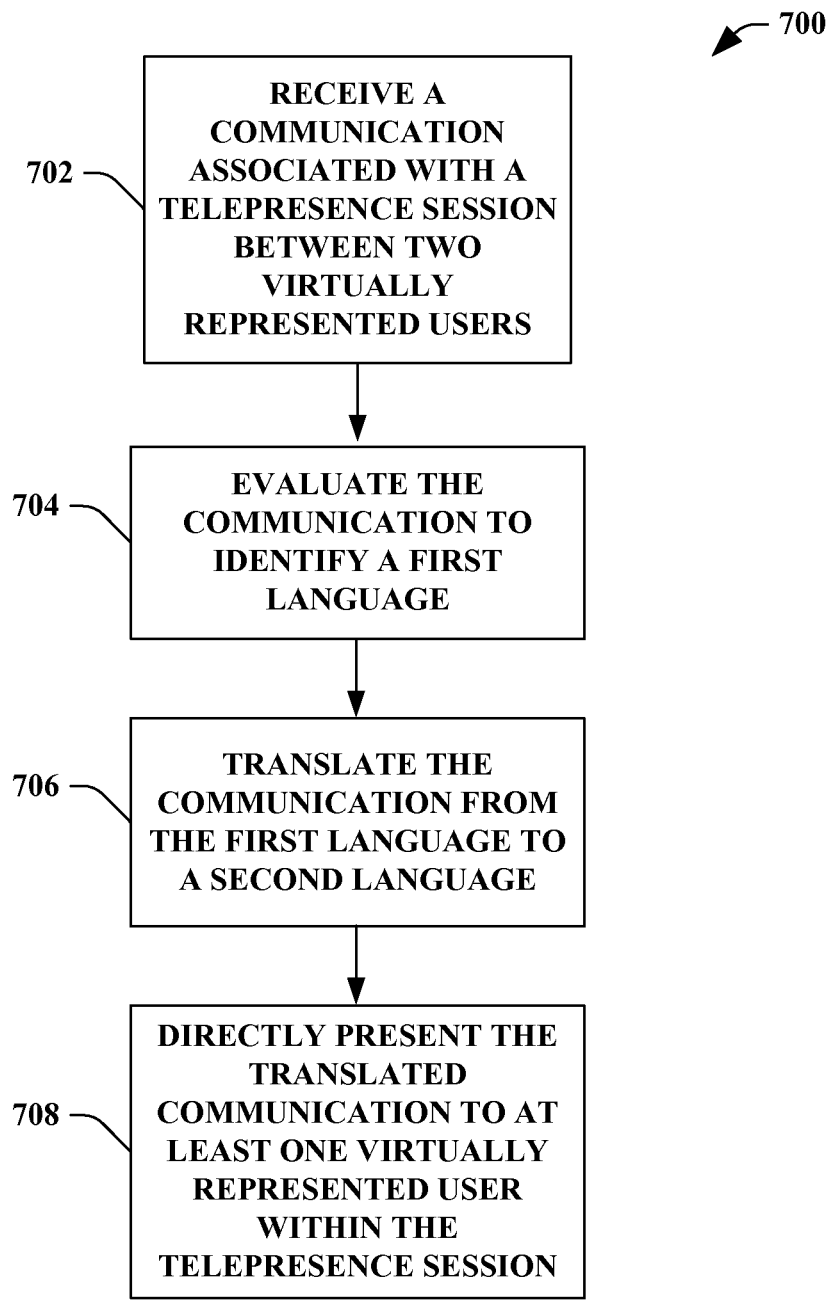
FIG. 7 illustrates an exemplary methodology for enabling translation between two disparate languages within a telepresence session.
Figure 8:
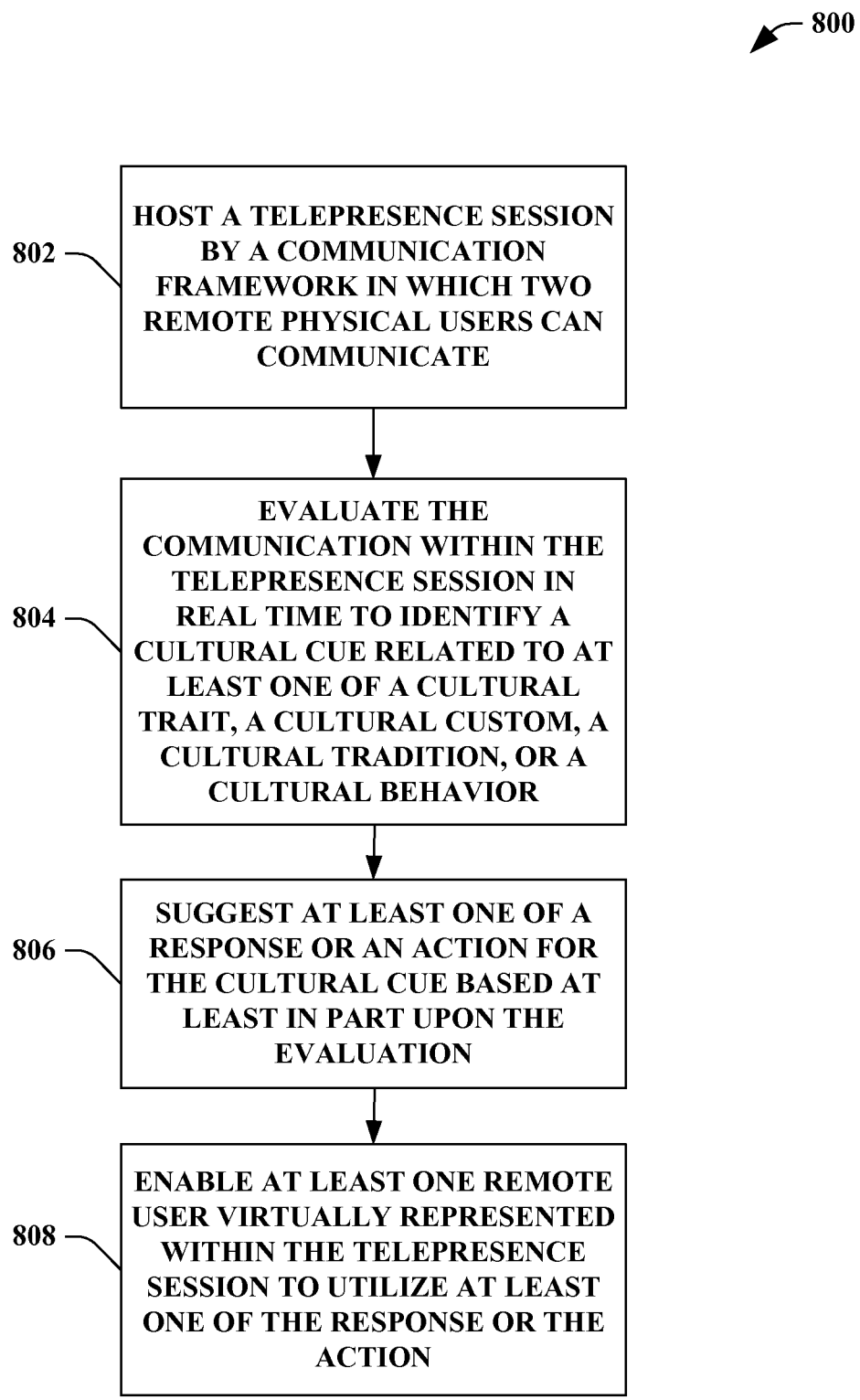
FIG. 8 illustrates an exemplary methodology that facilitates suggesting a response or action based upon an identified cultural cue detected within a telepresence session.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates enabling translation between two disparate languages within a telepresence session. At reference numeral 702, a communication associated with a telepresence session between two virtually represented users can be received. The communication can be, but is not limited to, audio, video, voice, graphic, text, hand-written, gestures, movements, etc. At reference numeral 704, the communication can be evaluated to identify a first language. For example, the communication within the telepresence session can be analyzed in order to ascertain a first language (e.g., written, oral, spoken, typed, gestured, etc.). At reference numeral 706, the communication can be translated from the first language to a second language. At reference numeral 708, the translated communication can be directly presented to at least one virtually represented user within the telepresence session. For instance, the translated communicated can be directly presented to the virtual user within the telepresence session by audio, video, text, graphics, subtitles, closed captioning, etc.

FIG. 8 illustrates a method 800 for suggesting a response or action based upon an identified cultural cue detected within a telepresence session. At reference numeral 802, a telepresence session can be hosted by a communication framework in which two remote physical users can communicate therein. At reference numeral 804, the communication within the telepresence session can be evaluated in real time to identify a culture cue related to at least one of a cultural trait, a cultural custom, a cultural tradition, or a cultural behavior. For example, the cultural cues can relate to appearance (e.g., virtual representation appearance, clothing, physical appearance, accessories, etc.), introductions (e.g., start of a meeting, bowing, shaking hands, greetings, etc.), offensive behavior to avoid (e.g., words, phrases, hand gestures, etc.), pleasantries to encourage (e.g., words, phrases, responses, etc.), demonstrations of respect (e.g., eye-contact, sitting down, speaking, etc.), virtual exchange (e.g., exchanging business cards, exchanging documents, exchanging gifts, etc.), farewells (e.g., end of a meeting, bowing, shaking hands, verbal goodbyes, etc.), gestures, movements, and/or any other events or situations that arise between two or more users within the telepresence session 104 in which a particular action or response is preferred in a culture.

At reference numeral 806, at least one of a response or an action can be suggested for the culture cue based at least in part upon the evaluation. In general, an identified cultural cue can include a corresponding response or action. At reference numeral 808, at least one remote user virtually represented within the telepresence session can utilize at least one of the response or the action. For example, the response or action can be suggested to the user in which the user can select to implement such action or response or not. In another example, the response or action can be automatically implemented. In still another example, the user can define a portion of responses or actions to be automatically implemented, whereas another portion of responses or actions can leverage user-intervention.

Figure 9:
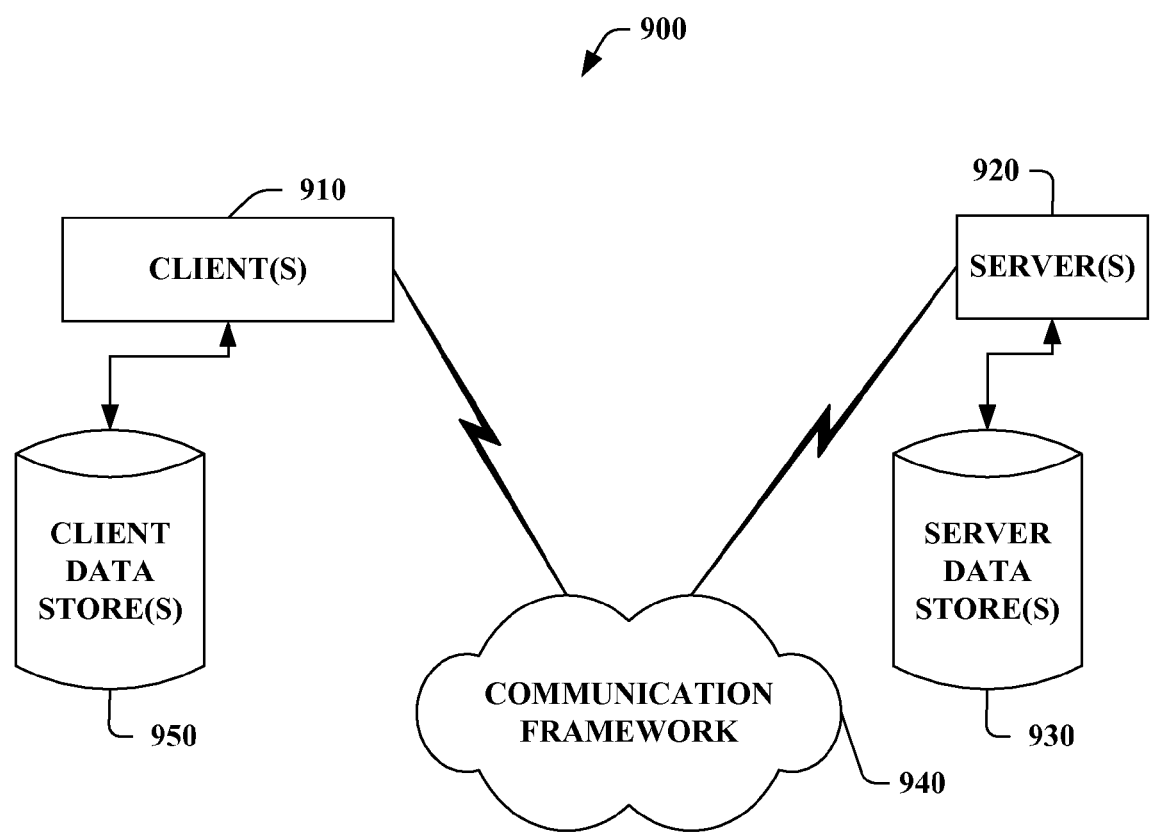
FIG. 9 illustrates an exemplary networking environment, wherein the novel aspects of the claimed subject matter can be employed.
Figure 10:
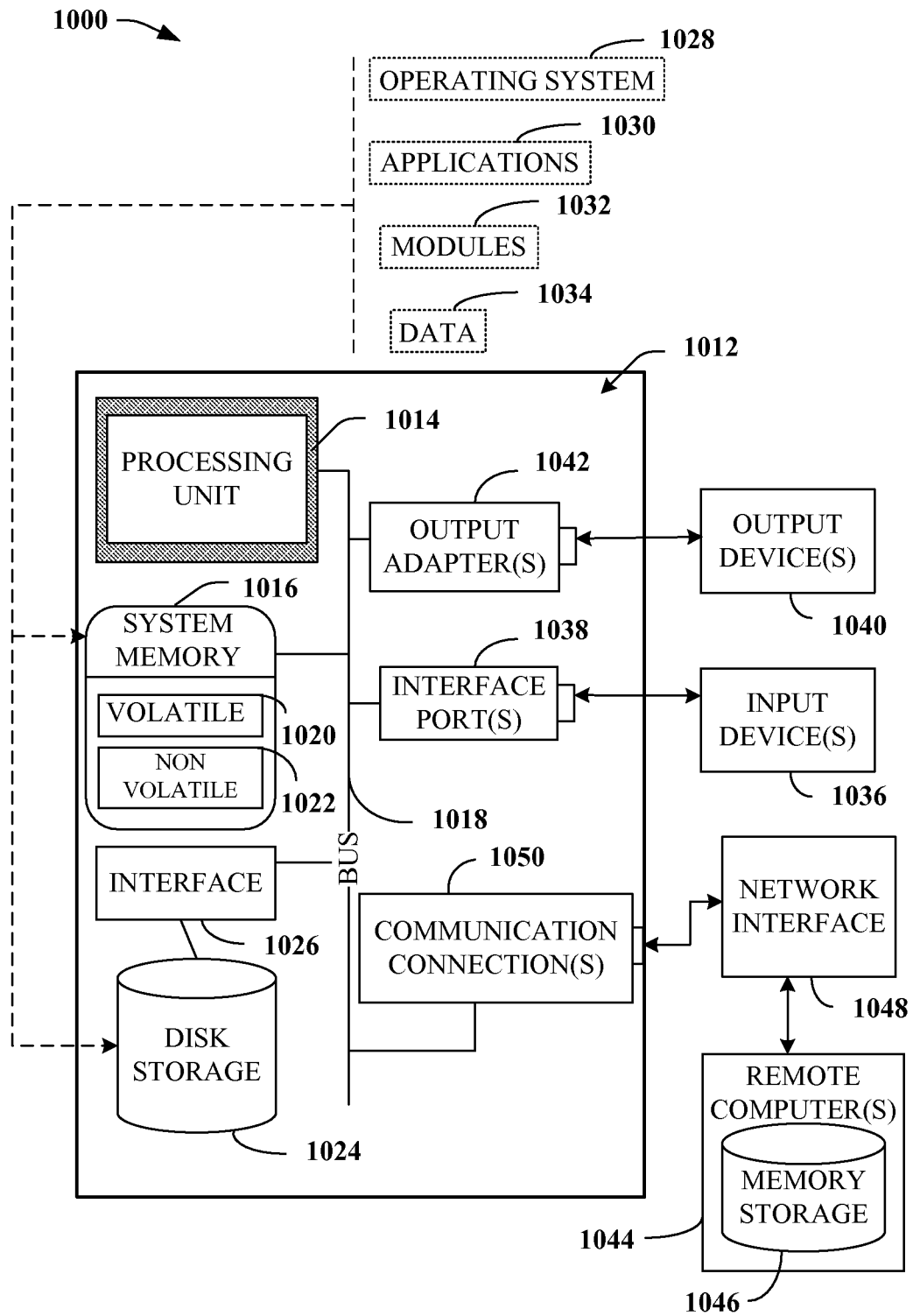
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an interpreter component that provides automatic language translations for a telepresence session and/or cultural cues with suggested responses or actions, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates communication within a telepresence session, comprising:
   a processor;
   computer storage media having stored therein computer executable components comprising;
   an interface component that presents a telepresence session initiated within a communication framework that includes two or more virtually represented users that have a communication therein, the telepresence session including at least one virtually represented user that communicates in a first language, the communication being at least one of a portion of audio, a portion of video, a portion of graphic, a gesture, or a portion of text;
   an interpreter component evaluates the communication to translate the first language into a second language within the telepresence session, the translation being automatically provided to at least one other virtually represented user within the telepresence; and
   a cultural engine that identifies a cultural cue relating to the communication and utilizes an interest indicator to ascertain a level of interest in the communication for at least one of the two or more virtually represented users based on the cultural cue, the interest indicator including a level of accessing data related to the telepresence session.

2. The system of claim 1, wherein the first language is at least one of English, Mandarin, Hindustani, Spanish, Arabic, Portuguese, Bengali, Russian, Japanese, German, Punjabi, Wu, Javanese, Telugu, Marathi, Vietnamese, Korean Tamil, French, Italian, Cantonese, Turkish, or Sindhi.

3. The system of claim 2, wherein the second language is at least one of English, Mandarin, Hindustani, Spanish, Arabic, Portuguese, Bengali, Russian, Japanese, German, Punjabi, Wu, Javanese, Telugu, Marathi, Vietnamese, Korean Tamil, French, Italian, Cantonese, Turkish, or Sindhi.

4. The system of claim 1, wherein the cultural cue relates to at least one of a cultural trait, a cultural custom, a cultural tradition, or a cultural behavior.

5. The system of claim 4, wherein the cultural engine observes at least one of a communication within the telepresence session or a portion of data related to the telepresence session in order to identify the cultural cue.

6. The system of claim 4, wherein the portion of data is at least one of a meeting detail, a meeting start time a meeting end time, a date of a meeting, a portion of participant information, a participant physical location, a portion of profile information, an age of a participant, a connectivity of a participant, an employee position, or a portion of data related to an employee.

7. The system of claim 4, wherein the cultural cue corresponds to at least one of an appearance, an introduction, an offensive behavior to avoid, a pleasantry to encourage, a demonstration of respect, a virtual exchange, or a farewell.

8. The system of claim 4, wherein the cultural engine generates at least one of a suggested response or a suggested action based at least in part upon the cultural cue identified.

9. The system of claim 4, wherein the cultural engine ascertains a level of interest that is cultural dependent and based upon the observation of at least one of an amount of eye contact, a participation amount, a data interaction, a movement, or an action.

10. The system of claim 4, further comprising a virtual presence adjuster that manipulates a virtual presence associated with the virtually represented user within the telepresence based upon at least one of the translated communication or the identified cultural cue.

11. The system of claim 10, the virtual presence is at least one of an avatar, a graphic, a picture, a live-video stream, a stream from a web-camera, a portion of text, a portion of video, an animated object, or a displayable item that place holds a presence for the virtually represented user within the telepresence session.

12. The system of claim 11, wherein the virtual presence adjuster implements a replication of at least one of the translated communication, a response to the identified cultural cue, or an action to the identified cultural cue.

13. The system of claim 4, further comprising a real time collector that analyzes real time communications between two or more virtually represented users within the telepresence session to identify at least one of a cultural cue, a response to a cultural cue, or an action to a cultural cue.

14. The system of claim 4, further comprising a pre-defined collector that defines at least one of a pre-established cultural cue, a response to a cultural cue, or an action to a cultural cue.

15. The system of claim 14, wherein the pre-defined collector ascertains at least one of the cultural cue, the response to a cultural cue, or the action to a cultural cue based upon at least one of a cultural expert, a cultural database, a user-defined preference, a user from a culture, an entity experienced with a cultural, a cultural survey, a business survey, or a portion of collected user defined data related to a culture.

16. The system of claim 15, further comprising a network of two or more users that input information related to at least one of a cultural cue, a response to a cultural cue, or an action to a cultural cue, the information is aggregated to create a general database of information leveraged by the cultural engine.

17. A computer-implemented method that facilitates employing universal language translation and cultural interpretation within a telepresence session, comprising:
presenting the telepresence session initiated within a communication framework that includes two or more virtually represented users that have a communication therein, the telepresence session including at least a first virtually represented user that communicates in a first language, the communication being at least one of a portion of audio, a portion of video, a portion of graphic, a gesture, or a portion of text;
evaluating the communication to translate the first language into a second language within the telepresence session, the translation being automatically provided to at least a second virtually represented user within the telepresence;
identifying a cultural cue relating to the communication; and
utilizing an interest indicator to ascertain a level of interest in the communication for at least one of the two or more virtually represented users based on the cultural cue, the interest indicator including a level of accessing data related to the telepresence session.

18. The computer-implemented method of claim 17, wherein:
the two or more virtually represented users include the first virtually represented user represented by a first virtual presence and the second virtually represented user represented by a second virtual presence; and
the evaluating the communication to translate the first language into the second language within the telepresence session comprises updating the first virtual presence to speak in the second language based on the translating within the telepresence session such that, from a perspective of the second virtually represented user, the first user represented by the first virtual presence speaks the second language.

19. The computer-implemented method of claim 17, further comprising:
suggesting at least one of a response or an action for the cultural cue based at least in part upon the evaluating; and
enabling at least one of the two or more virtually represented users within the telepresence session to utilize at least one of the response or the action.

20. A computer-readable storage medium having computer-executable instructions encoded thereon that upon execution configure a computer to perform operations comprising:
employing a telepresence session within a communication framework that includes two or more virtually represented users that communicate therein;
enabling at least one virtually represented user of the two or more virtually represented users to communicate within the telepresence session in a first language;
evaluating the communication to translate the first language into a second language within the telepresence session;
providing the translation to at least another virtually represented user of the two or more virtually represented users within the telepresence;
evaluating data within the telepresence session in real time to identify a cultural cue related to at least one of a cultural trait, a cultural custom, a cultural tradition, or a cultural behavior, the data including meeting details including at least one of a start time and a date of the communication, and participant information including a physical location, an age, and an employment information of the at least one virtually represented user or the at least another virtually represented user of the two or more virtually represented users;
identifying one or more phrases of the first language or the second language that are offensive based on the cultural cue;
suggesting avoiding using the identified one or more phrases;
identifying one or more actions of the at least one virtually represented user or the at least another virtually represented user of the two or more virtually represented users that are offensive; and automatically restricting a presentation of the identified one or more actions in the telepresence session.

* * * * *